(12) United States Patent
Wei et al.

(10) Patent No.: US 10,447,793 B2
(45) Date of Patent: Oct. 15, 2019

(54) DETECTING SHARED ACCESS

(71) Applicant: Hangzhou DPtech Technologies Co., Ltd., Zhejiang Province, Hangzhou (CN)

(72) Inventors: Fangzheng Wei, Hangzhou (CN); Xiaodong Zhang, Hangzhou (CN)

(73) Assignee: Hangzhou DPtech Technologies Co., Ltd., Hangzhou (CN)

( * ) Notice: Subject to any disclaimer, the term of this patent is extended or adjusted under 35 U.S.C. 154(b) by 397 days.

(21) Appl. No.: 15/396,956

(22) Filed: Jan. 3, 2017

(65) Prior Publication Data
US 2017/0331911 A1    Nov. 16, 2017

(30) Foreign Application Priority Data

May 16, 2016 (CN) .......................... 2016 1 0326292

(51) Int. Cl.
*H04L 29/08* (2006.01)
*H04L 29/12* (2006.01)
(Continued)

(52) U.S. Cl.
CPC ................ *H04L 67/22* (2013.01); *G06F 9/00* (2013.01); *G06F 16/00* (2019.01); *G06F 16/955* (2019.01); *H04L 12/14* (2013.01); *H04L 41/069* (2013.01); *H04L 43/026* (2013.01); *H04L 43/16* (2013.01); *H04L 47/803* (2013.01); *H04L 61/255* (2013.01); *H04L 67/146* (2013.01);
(Continued)

(58) Field of Classification Search
CPC .... G06F 16/955; H04L 61/146; H04L 67/255
See application file for complete search history.

(56) References Cited

U.S. PATENT DOCUMENTS 7,127,524 B1 * 10/2006 Renda .................... H04L 29/12
                                                            709/245
9,246,710 B2 *  1/2016 Jallapelli ............. H04L 12/6418
(Continued)

FOREIGN PATENT DOCUMENTS

| CN | 101035031 A | 9/2007 |
| CN | 103152325 A | 6/2013 |
| CN | 103457789 A | 12/2013 |

OTHER PUBLICATIONS

State Intellectual Property Office of the People's Republic of China, Office Action and Search Report Issued in Application No. 201610326292.7, dated Sep. 3, 2018, 7 pages, and an English translation of the Office Action.
(Continued)

*Primary Examiner* — George C Neurauter, Jr.
(74) *Attorney, Agent, or Firm* — McCoy Russell LLP

(57) ABSTRACT

A method and a device for detecting shared access are provided in the present disclosure. The method comprises: receiving an application layer packet from a user terminal; extracting a public network IP accessed by the user terminal and a data stream feature from the received application layer packet, where the data stream feature uniquely identifies the user terminal; determining a number of user terminals which access the public network IP according to the data stream feature; and determining that there is shared access for the public network IP if the number of user terminals accessing the public network IP is greater than a first threshold.

18 Claims, 12 Drawing Sheets

(51) Int. Cl.
*G06F 16/955* (2019.01)
*H04L 12/24* (2006.01)
*H04L 12/26* (2006.01)
*H04L 12/927* (2013.01)
*G06F 9/00* (2006.01)
*H04L 12/14* (2006.01)
*H04W 4/24* (2018.01)
*H04M 15/00* (2006.01)
*G06F 16/00* (2019.01)
*H04L 29/06* (2006.01)

(52) U.S. Cl.
CPC .......... *H04L 67/303* (2013.01); *H04M 15/00* (2013.01); *H04W 4/24* (2013.01); *H04L 61/2514* (2013.01); *H04L 67/02* (2013.01); *H04L 69/22* (2013.01)

(56) References Cited

U.S. PATENT DOCUMENTS

2006/0109839 A1* 5/2006 Hino ............... H04L 63/083
370/352
2011/0185060 A1* 7/2011 Park ............... H04L 63/0227
709/224

OTHER PUBLICATIONS

State Intellectual Property Office of the People's Republic of China, Office Action and Search Report Issued in Application No. 201610326292.7, dated Jun. 5, 2019, 16 pages.

\* cited by examiner

DETECTING SHARED ACCESS

CROSS-REFERENCE TO RELATED APPLICATIONS

The application claims priority to Chinese Patent Application No. 201610326292.7, filed on May 16, 2016, the entire contents of which are hereby incorporated by reference for all purposes.

TECHNICAL FIELD

The present disclosure relates to detecting shared access in the field of communications technology.

BACKGROUND

Network shared access may refer to a behavior of Internet surfing, where a plurality of user terminals may share a public network Internet Protocol (IP) through Network Address Translation (NAT), HyperText Transfer Protocol (HTTP) and so on.

At present, Internet broadband access service may mainly adopt a manner of duration-based charging instead of a manner of traffic-based charging. Different Internet access manners may differ greatly in consumption of bandwidth resources, and thus different fees may be charged. However, at present it may be difficult to directly detect that how many user terminals within a local area network share an IP address, which may cause enormous income loss to operators.

A method of detecting shared access may mainly include a method of analyzing an HTTP packet header. According to the method, the number of user terminals sharing Internet may be determined by analyzing the number of operating system versions and browser versions in a User-Agent field of an HTTP protocol request packet.

However, current user terminal operating system versions may be centralized, for example, most of operating systems may be Windows operating system. This may cause a misjudgement that there is not Internet sharing for an IP when a plurality of user terminals use a same operating system to share access to the IP for Internet surfing.

Furthermore, browsers with different versions may be installed on a user terminal. If an existence of shared access is directly determined according to a detection result that there are a plurality of browser versions, a misjudgement may also be caused when a user terminal uses browsers with a plurality of versions for Internet surfing.

SUMMARY

The present disclosure may provide a method of detecting shared access and a device for detecting shared access to overcome disadvantages in related technologies.

According to a first aspect of examples of the present disclosure, a method of detecting shared access may be provided, including:

receiving, by an access equipment, an application layer packet from a user terminal;

extracting, by the access equipment, a public network IP accessed by the user terminal and a data stream feature from the received application layer packet, where the data stream feature uniquely identifies the user terminal;

determining, by the access equipment, a number of user terminals which access the public network IP according to the data stream feature; and determining, by the access equipment, that there is shared access for the public network IP if the number of user terminals accessing the public network IP is greater than a first threshold.

Optionally, extracting a public network IP accessed by the user terminal and a data stream feature from received the application layer packet may include:

resolving, by the access equipment, the application layer packet to determine an application type of the application layer packet;

determining, by the access equipment, an extraction strategy according to the application type of the application layer packet;

extracting, by the access equipment, a public network IP accessed by the user terminal from the application layer packet; and extracting, by the access equipment, a data stream feature from the application layer packet according to the determined extraction strategy.

Optionally, after determining a number of user terminals which access the public network IP according to the data stream feature, the method may further include:

determining, by the access equipment, a number of different data stream features for application layer packets of each application type; and determining, by the access equipment, that there is shared access for the public network IP when there are a plurality of different data stream features for application layer packets of an application type.

Optionally, the method may further include:

determining, by the access equipment, a maximum value of the number of different data stream features for application layer packets of each application type, and taking, by the access equipment, the maximum value as the number of user terminals which access the public network IP.

Optionally, the method may further include:

determining, by the access equipment, whether the maximum value is greater than a second threshold or not; and executing, by the access equipment, an access control on application layer packets of the public network IP if the maximum value is greater than the second threshold, where the access control may include at least one of followings:

sending prompt information to a user terminal accessing the public network IP, controlling a network resource acquiring speed of the public network IP, and blocking an application layer packet of the public network IP.

According to another aspect of the present disclosure, a device for detecting shared access may be further provided, which invokes machine readable instructions corresponding to a control logic for detecting shared access stored on a storage medium and executes the machine readable instructions to:

receive an application layer packet from a user terminal;

extract a public network IP accessed by the user terminal and a data stream feature from the received application layer packet, where the data stream feature uniquely identifies the user terminal;

determine a number of user terminals which access the public network IP according to the data stream feature; and determine that there is shared access for the public network IP if the number of user terminals accessing the public network IP is greater than a first threshold.

Optionally, when extracting the public network IP accessed by the user terminal and the data stream feature from the received application layer packet, the machine-executable instructions cause the processor to:

resolve the application layer packet to determine an application type of the application layer packet;

determine an extraction strategy according to the application type of the application layer packet;

extract a public network IP accessed by the user terminal from the application layer packet; and extract a data stream feature from the application layer packet according to the determined extraction strategy.

Optionally, when determining a number of user terminals which access the public network IP according to the data stream feature, the machine-executable instructions cause the processor to:

determining a number of different data stream features for application layer packets of each application type; and determine that there is shared access for the public if there are a plurality of different data stream features for application layer packets of an application type.

Optionally, when determining the number of user terminals which access the public network IP according to the number of different data stream features for application layer packets of each application type, the machine-executable instructions cause the processor to:

determine a maximum value of the number of different data stream features for application layer packets of each application type; and take the maximum value as the number of user terminals which access the public network IP.

Optionally, the machine-executable instructions further cause the processor to:

determine whether the maximum value is greater than a second threshold or not; and execute an access control on application layer packets of the public network IP if the maximum value is greater than the second threshold.

The access control may include at least one of followings:

sending prompt information to a user terminal accessing the public network IP;

controlling a network resource acquiring speed of the public network IP; and blocking an application layer packet of the public network IP.

The technical solution provided by the examples of the present disclosure may include the following beneficial effects.

As can be seen from the foregoing examples, in the present disclosure, the accuracy in detecting shared access may be improved by receiving an application layer packet from a user terminal and determining whether there is shared access for a public network IP according to the number of data stream features for application layer packets.

It may be understood that both the foregoing general description and the following detailed description are exemplary and explanatory only and are not restrictive of the present disclosure.

BRIEF DESCRIPTION OF DRAWINGS

The accompanying drawings, which may be incorporated in and constitute a part of this specification, illustrate examples consistent with the present disclosure and, together with the description, serve to explain the principles of the present disclosure.

DETAILED DESCRIPTION

Exemplary examples will be described herein in detail, examples of which may be illustrated in the accompanying drawings. The following description refers to the accompanying drawings in which same numbers in different drawings may represent the same or similar elements unless otherwise represented. The implementations described in the following exemplary examples do not represent all implementations consistent with the present disclosure. Instead, they are merely examples of devices and methods consistent with aspects related to the present disclosure as recited in the appended claims.

Figure 1:
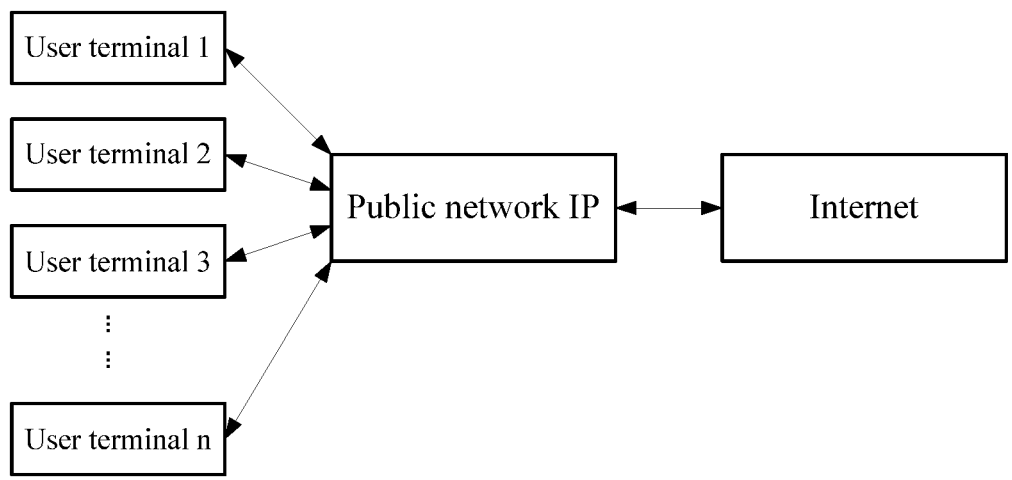
FIG. 1 is a schematic diagram of an application scenario of a method of detecting shared access according to an example of the present disclosure.

Referring to FIG. 1, which is a schematic diagram of an application scenario of a method of detecting shared access according to an example of the present disclosure.

As shown in FIG. 1, shared access may refer to a behavior of Internet surfing, where a plurality of user terminals may share a public network Internet Protocol (IP) through Network Address Translation (NAT) and HyperText Transfer Protocol (HTTP), etc. The method of detecting shared access disclosed in an example may be used to determine whether there are a plurality of user terminals which access a public network IP to access the Internet according to a data stream feature in an application layer packet by receiving application layer packets of a user terminal.

There may be mainly several methods of detecting shared access used in related technologies as below.

1. A continuity of an Internet Protocol identification (IPID) in an IP packet may be detected.

An IPID field of an IP packet sent by a user terminal may cycle from 0 to 65535 and monotonically increase and vary, and an intermediate network device, such as a router, a firewall and so on, may not modify the field. Therefore, whether the same user terminal has been accessed an IP may be determined by detecting the continuity of the IPID of the IP packet.

However, when a plurality of user terminals access to an IP, the continuity of the IPID may seem chaotic. Furthermore, at present, a high-performance user terminal may send IP packets at a high frequency, and the IPID may finish one cycle from 0 to 65535 within a short time. Therefore, when a period in completing one cycle is less than a detection period, even though a plurality of user terminals access to an IP, a detection result may still indicate the IPID is monotonically increased. Therefore, it may be determined that only a user terminal accesses to the IP, which may cause a deviation of the detection result.

2. A method of detecting an MAC address

Whether data packets of an IP correspond to a plurality of MAC addresses may be determined. If data packets of the IP correspond to a plurality of MAC addresses, it may be determined that there is Internet sharing for the IP.

However, the method may be not effective for a detection regarding to NAT and HTTP proxy surfing.

3. A method of analyzing an HTTP packet header

It may be determined that a number of user terminals accessing an IP by analyzing the number of operating system versions and browser versions in a User-Agent field of an HTTP protocol request packet.

However, current user terminal operating system versions may be centralized, for example, most of operating systems may be Windows operating system. This may cause a misjudgement that there is not Internet sharing for the IP when a plurality of user terminals use a same operating system to shared access to the IP for Internet surfing.

Browsers with different versions may be installed on a user terminal. If an existence of shared access is directly determined according to a detection result that there are a plurality of browser versions, a misjudgement may also be caused when a user terminal uses browsers with a plurality of versions for Internet surfing.

4. Methods of actively detecting user terminal information

Active detection methods may mainly include followings.

(1) According to access request commands sent by a user terminal, a user terminal information querying command may be sent to the user terminal to force the user terminal to return information that may identify characteristics of the user terminal, such as an MAC, a user terminal identification or the like. It may be further determined the number of user terminals accessing an IP according to the information of the user terminal.

(2) According to a GET request of an HTTP protocol sent by the user terminal, a packet responded by a server may be hijacked, and a unique field value of set cookie may be added into the response packet. When the user terminal again requests to access a same webpage, a special field value of cookie may be carried, and whether there is shared access for the Internet may be determined by the uniqueness of the field value of cookie.

This method may constantly need to send a packet to a user terminal, which may greatly increase network burden and performance burden of a device for detecting shared access, and the packet to be sent may be blocked by a browser in most cases, thereby it may be unable to acquire user terminal information.

In an example of a method of detecting shared access of the present disclosure, an access equipment may receive an application layer packet of a public network IP, so as to determine whether there is shared access for the public network IP according to the number of data stream features for the application layer packet. In this way, accuracy and applicability in detecting shared access may be improved, and excessively increasing a network burden and a burden of a device for detecting shared access may be avoided. Examples of the method of detecting shared access in the present disclosure will be described in detail with reference to the accompanying drawings.

Figure 2:
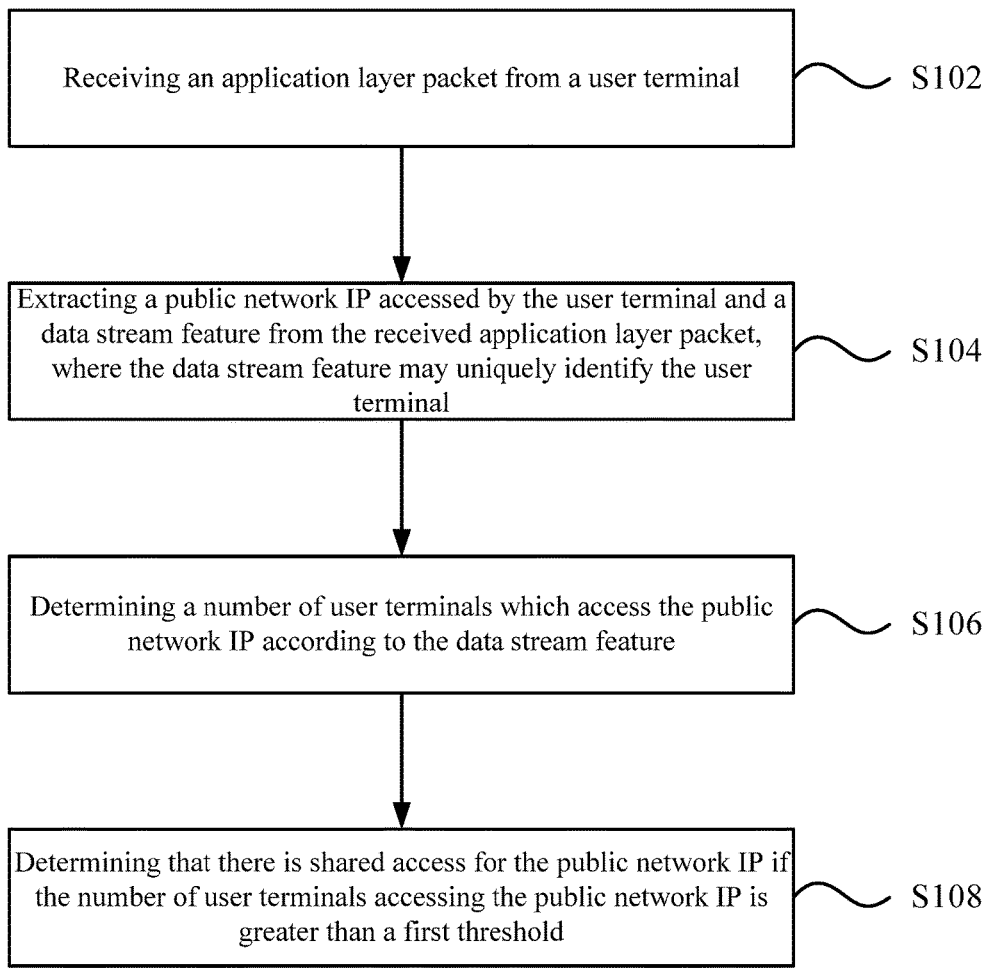
FIG. 2 is a schematic flowchart of a method of detecting shared access according to an example of the present disclosure.

As shown in FIG. 2, the method of detecting shared access according to an example of the present disclosure may include following blocks.

At block S102, an application layer packet from a user terminal may be received.

At block S104, a public network IP accessed by the user terminal and a data stream feature may be extracted from the application layer packet, where the data stream feature uniquely identifies the user terminal.

At block S106, a number of user terminals which access the public network IP according to the data stream feature may be determined.

At block S108, it may be determined that there is shared access for the public network IP if the number of user terminals which access the public network IP is greater than a first threshold.

According to an example, since a part of data stream features for application layer packets in a user terminal has uniqueness, the part of data stream features uniquely identifies the user terminal. For example, when 360 Safeguard starts update, the 360 Safeguard may detect a version. An application layer packet sent at the moment immediately may be a packet for requesting URL, where a data stream feature for the application layer packet may be a mid field value carried in the packet for requesting URL. Specifically, the packet for requesting URL may be as below:

GET/v3/safeup_lib.cab?autoupdate=false&pid=h_home_inst&uid=1&mid=ed461ccbde48d81612301ad712de0060&ver=9.7.0.2001&sysver=5.1.2600.256.1.3&pa=x86&type=tray&rt=0<=0&ue=1&language=chs HTTP/1.1
Accept: */*
User-Agent: Mozilla/4.0 (compatible; MSIE 6.0; Windows NT 5.1; SV1)
Host: update.360safe.com
Connection: Close
Cache-Control: no-cache The mid field value may be ed461ccbde48d81612301ad712de0060. Different user terminals may have different mid field values.

Of course, the data stream feature may be not limited to a mid value. Application layer packets with different application types may have different data stream features. For example, the foregoing application type may be the 360 Safeguard, and the data stream feature thereof may be a mid value in a request URL. If the application type is SogouInput, an h value in a request URL thereof may serve as the data stream feature. If the application type is Thunder, a peerid value in a request URL thereof may serve as the data stream feature.

Application layer packets with different application types may have different data stream features. However, data stream features for a user terminal corresponding to application layer packets with an application type may be identical, and data stream features for different user terminals corresponding to application layer packets with an application type may be different. Therefore, whether there are different data stream features for application layer packets with an application type may be determined by extracting data stream features from application layer packets. When there are different data stream features for application layer packets with an application type, it may indicate that a plurality of user terminals access a same public network IP.

Of course, a number of different data stream features for application layer packets of an application type may be further determined, and equal to the number of user terminals sending application layer packets through an application program of the application type. In this way, whether there is shared access for the public network IP may be determined according to the number of user terminals. For example, the foregoing first threshold may be equal to 1, and when the number of user terminals is greater than 1, it may be determined that there is shared access for the public network IP.

According to the detection method in an example, the accuracy of a detection result may be effectively improved by receiving an application layer packet from a user terminal and determining whether there is shared access for a public network IP according to data stream features for the application layer packet, and this method may be available for detection for NAT and HTTP proxy surfing. Furthermore, since it may be unnecessary to send a packet to a user terminal, network burden and burden of a device for detecting shared access may be reduced.

Figure 3:
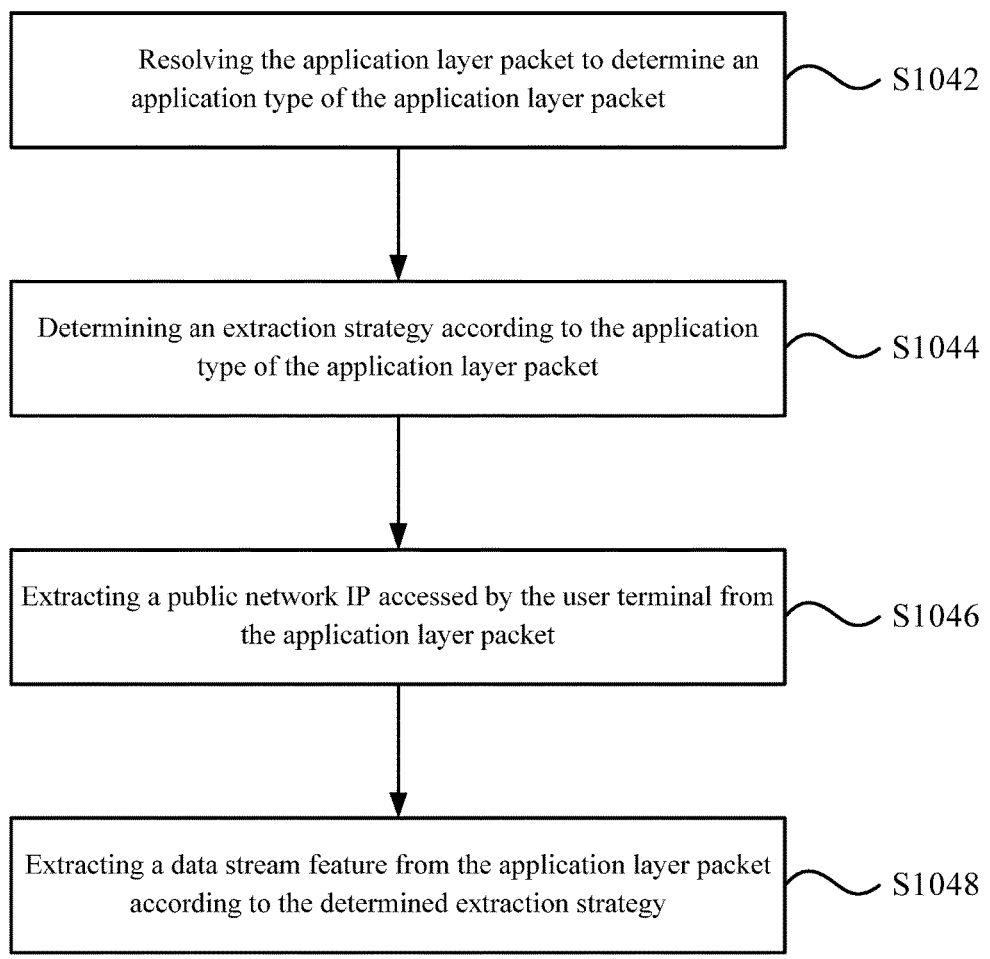
FIG. 3 is a schematic flowchart of extracting a public network IP accessed by a user terminal and a data stream feature from an application layer packet according to an example of the present disclosure.

As shown in FIG. 3, extracting a public network IP accessed by a user terminal and a data stream feature from an application layer packet may include following blocks.

At block S1042, the application layer packet may be resolved to determine an application type of the application layer packet.

At block S1044, an extraction strategy may be determined according to the application type of the application layer packet.

At block S1046, the public network IP accessed by the user terminal may be extracted from the application layer packet.

At block S1048, the data stream feature may be extracted from the application layer packet according to the determined extraction strategy.

It may be noted that execution of the block S1046 and the block S1048 may be in no particular order. For example, the block S1046 may be executed before the block S1048, the block S1048 may be also executed before the block S1046, or the block S1046 and the block S1048 may be simultaneously executed.

Data stream features for application layer packets of different application types may be different. As mentioned above, the mid value in the request URL of the application layer packet whose application type is the 360 Safeguard may serve as the data stream feature, the h value in the request URL of the application layer packet whose application type is the SogouInput may serve as the data stream feature, and the peerid value in the request URL of the application layer packet whose application type is the Thunder may serve as the data stream feature. Application layer packets with different application types may have different formats. Therefore, different extraction strategies may be used to extract data stream features from application layer packets with different application types so as to accurately extract data stream features from application layer packets of each application type.

Application layer packets may be resolved by means of deep packet inspection (DPI) to determine an application type of an application layer packet. Of course, an application layer packet may be also resolved by means of other methods to obtain a corresponding application type.

Figure 4:
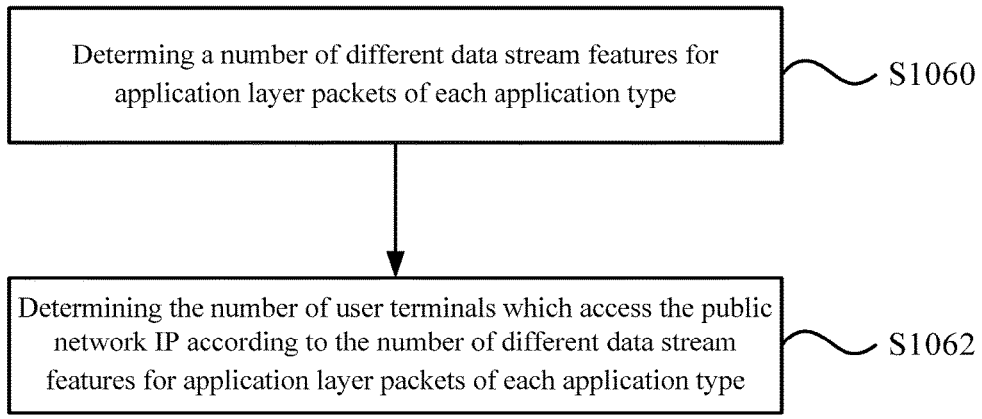
FIG. 4 is a schematic flowchart of a method of detecting shared access according to another example of the present disclosure.

As shown in FIG. 4, determining a number of user terminals which access the public network IP according to the data stream feature may include following blocks.

At block S1060, a number of different data stream features for application layer packets of each application type may be determined.

At block S1062, the number of user terminals which access the public network IP may be determined according to the number of different data stream features for application layer packets of each application type.

When there are different data stream features, it may be determined that user terminals accessing a public network IP are different, and the number of different data stream features may be used to indicate the number of user terminals accessing the public network IP. By determining the number of different data stream features, it may be convenient for a network operator to view the number of user terminals accessing a public network IP so as to make an accurate assessment and a proper treatment.

Figure 5:
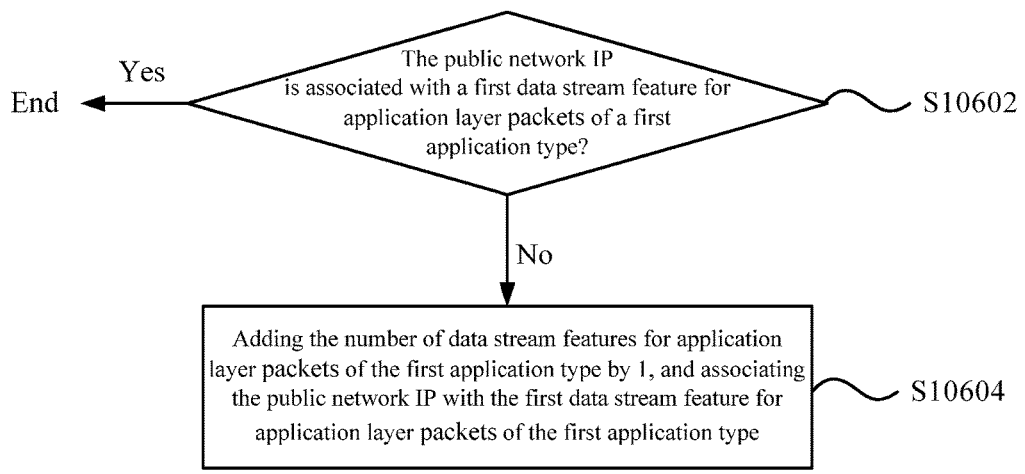
FIG. 5 is a schematic flowchart of determining a number of different data stream features for application layer packets of each application type according to an example of the present disclosure.

As shown in FIG. 5, determining the number of different data stream features for application layer packets of each application type may include following blocks.

At block S10602, whether the public network IP is associated with a first data stream feature of an application layer packet of a first application type or not may be determined; and At block S10604, if the public network IP is not associated with the first data stream feature yet, the number of data stream features for application layer packets of the first application type may be added by 1. Then the public network IP may be associated with the first data stream feature for application layer packets of the first application type.

For example, when a data stream feature whose application type is 360 Safeguard is extracted from an application layer packet, it may be detected whether there is an association relationship between the public network IP corresponding to the application layer packet and the data stream feature of the 360 Safeguard. If there is the association relationship, it may be determined that the data stream feature has been recorded in a previous application layer packet, which may indicate that a user terminal sending the application layer packet is not the user terminal newly accessing the public network IP. Therefore, no treatment may be performed. If the association relationship does not exist, it may be determined that a user terminal sending the application layer packet is the user terminal newly accessing the public network IP, e.g., the number of user terminals accessing the public network IP may be added by 1.

According to an example, data stream features for application layer packets with different application types may be respectively stored in different storage spaces. For example, the data stream feature of the application layer packet whose application type is the 360 Safeguard may be stored in a first storage space, and the data stream feature of the application layer packet whose application type is the Thunder may be stored in a second storage space. When determining the association relationship between the public network IP and the data stream feature, a corresponding storage space may be determined in advance according to the application type of the application layer packet corresponding to the data stream feature. In this way, the data stream feature associated with the public network IP may be queried from the determined storage space, and query efficiency may be improved.

Figure 6:
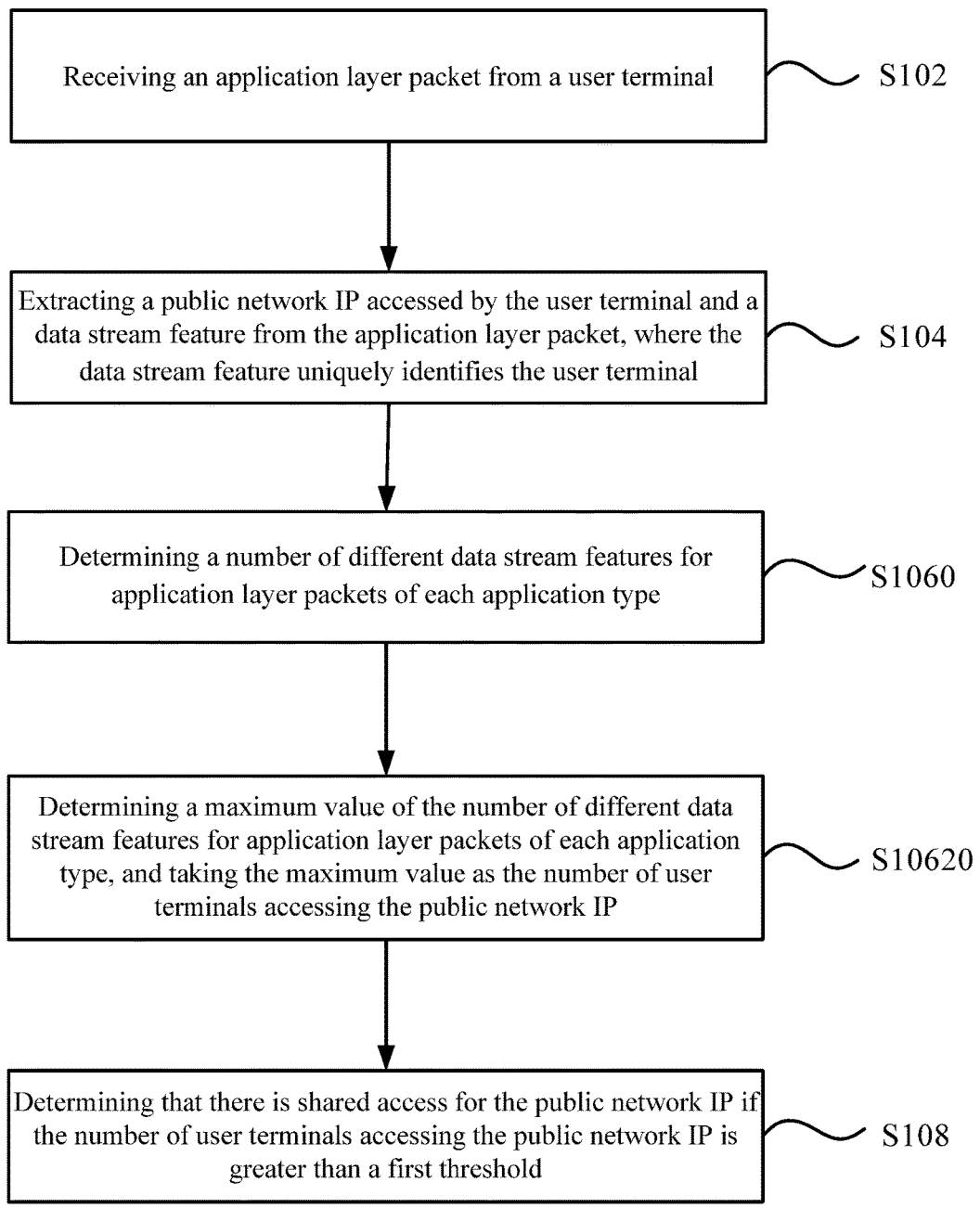
FIG. 6 is a schematic flowchart of a method of detecting shared access according to still another example of the present disclosure.

As shown in FIG. 6, according to an example, block S1062 in the method as shown in FIG. 4, determining the number of user terminals which access the public network IP according to the number of different data stream features for application layer packets of each application type may include following blocks.

At block S10620, a maximum value of the number of different data stream features for application layer packets of each application type may be determined, and the maximum value may be taken as the number of user terminals which access the public network IP.

For example, it may be assumed that there are four user terminals accessing a public network IP, two user terminals among the four user terminals may start the 360 Safeguard, three user terminals among the four user terminals may start the Thunder, and the four user terminals may start the SogouInput. In such a case, through the foregoing examples, it may be determined that the number of different data stream features corresponding to the application layer packet whose application type is the 360 Safeguard may be two, the number of different data stream features corresponding to the application layer packet whose application type is the Thunder may be three, and the number of different data stream features corresponding to the application layer packet whose application type is the SogouInput may be four. Since the four user terminals start different application programs, if the number of different data stream features corresponding to the application layer packet whose application type is the Thunder is taken as the number of user terminals accessing the public network IP, a statistical value may be less than an actual value.

According to this example, the maximum value of the number of different data stream features for application layer packets of all types may be taken as the number of user terminals which access the public network IP. For example, the number of different data stream features corresponding to the application layer packet whose application type is the SogouInput may be taken as the number of user terminals accessing the public network IP. In this way, a coincidence degree between the statistical value and the actual value may be effectively improved, and thus a detection precision may be effectively improved.

Figure 7:
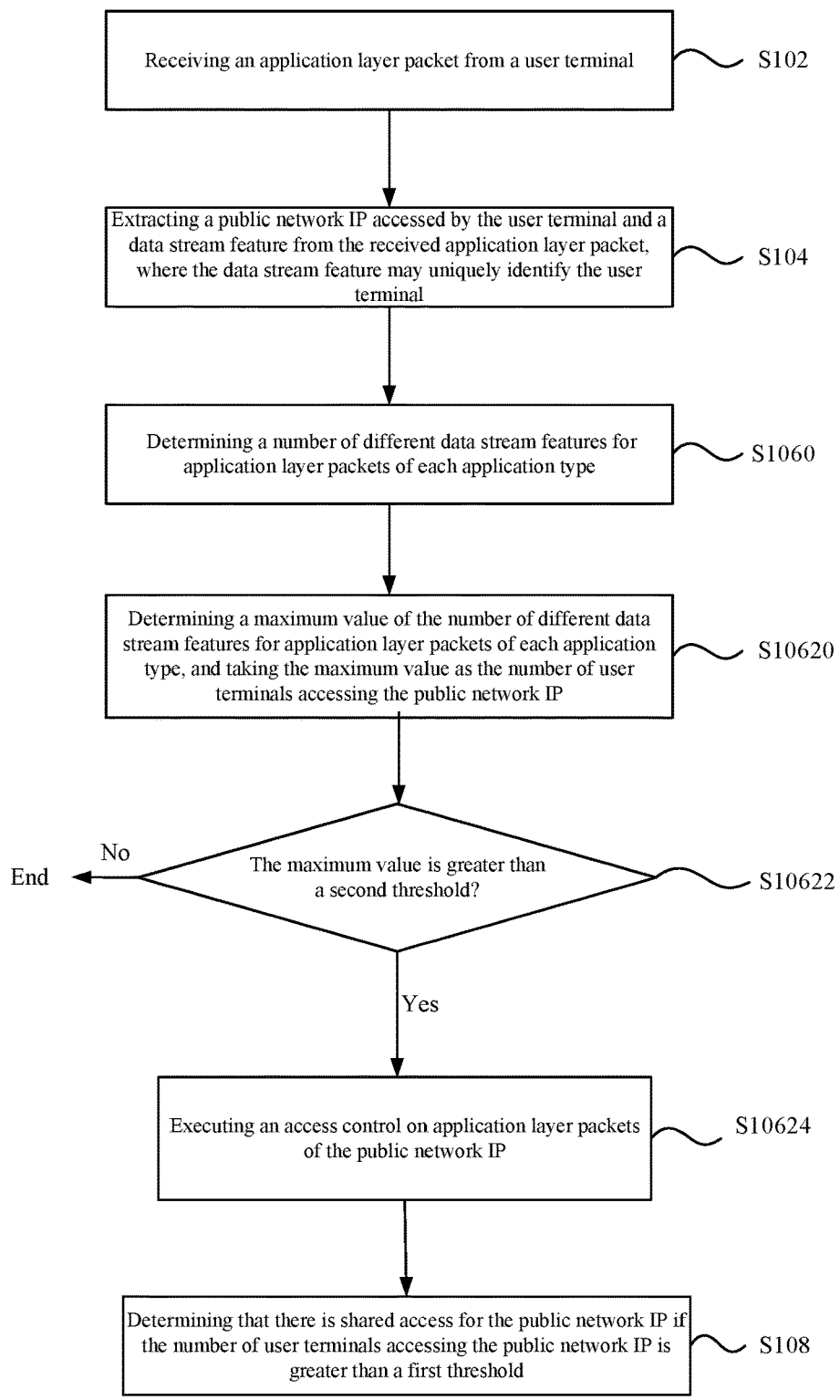
FIG. 7 is a schematic flowchart of a method of detecting shared access according to still another example of the present disclosure.

As shown in FIG. 7, according to an example, after determining a maximum value of the number of different data stream features for application layer packets of each application type, the method as shown in FIG. 6 may further include following blocks.

At block S10622, whether the maximum value is greater than a second threshold may be determined.

At block S10624, an access control may be executed on application layer packets of the public network IP if the maximum value is greater than the second threshold.

The access control may include at least one of followings:

sending prompt information to a user terminal accessing the public network IP so that an operator of the user terminal may dispose by himself or herself;

controlling a network resource acquiring speed of the public network IP to reduce network pressure where the public network IP is located; and blocking an application layer packet of the public network IP to reduce loss of a network operator.

A second threshold may be preset for the number of user terminals accessing a public network IP. When the number of user terminals accessing the public network IP exceeds the second threshold, a network operator may timely and effectively control the user terminals surfing the Internet through the public network IP. In this way, the network pressure may be alleviated, thereby reducing loss.

Figure 8:
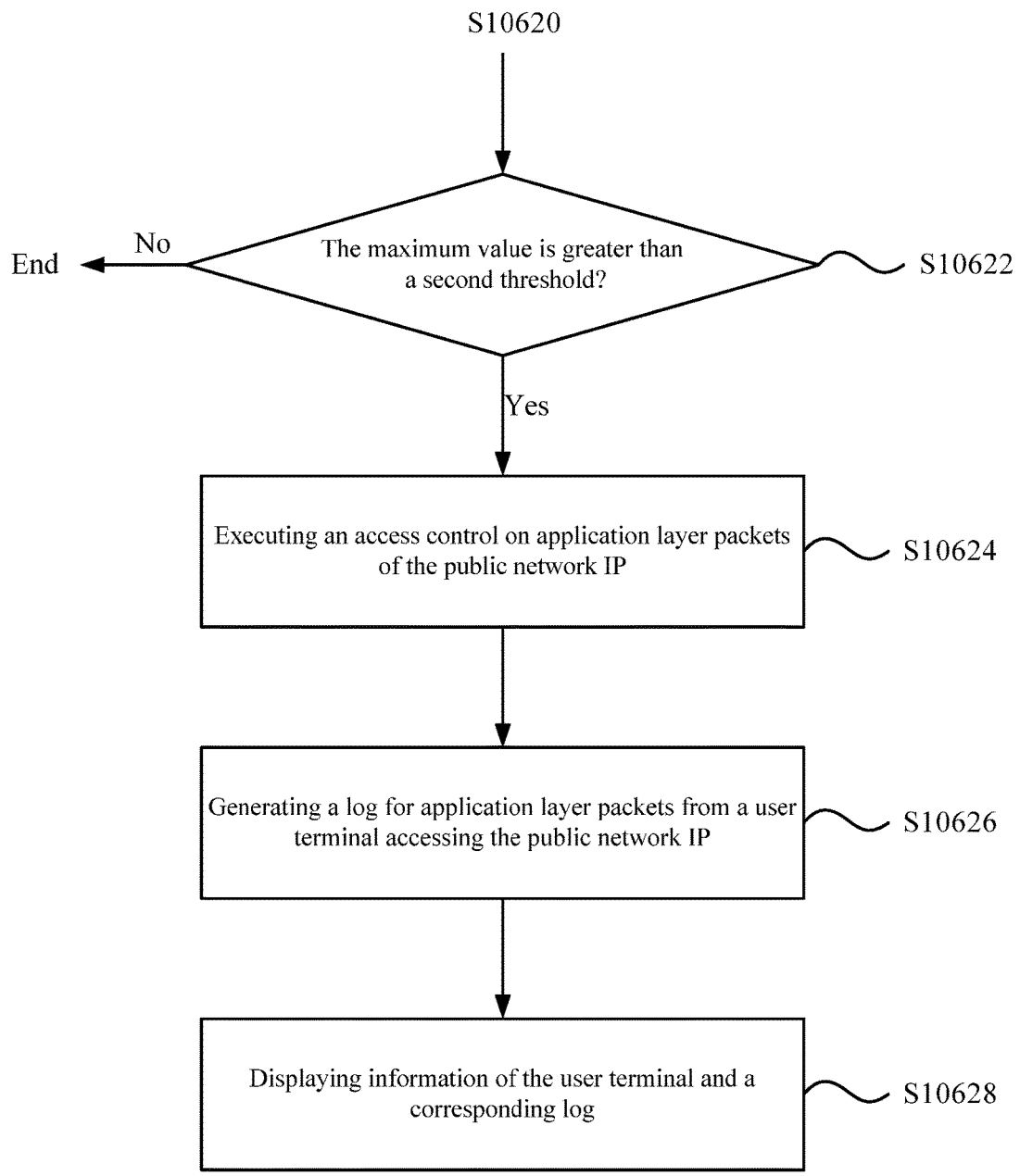
FIG. 8 is a schematic flowchart of a method of detecting shared access according to still another example of the present disclosure.

As shown in FIG. 8, where block S102-block S1060 are omitted, and block S10620 is displayed in a simplified way, optionally, when the maximum value is greater than the second threshold for the method as shown in FIG. 7, following blocks may also be executed.

At block S10626, a log may be generated for application layer packets from a user terminal accessing the public network IP.

At block S10628, information of the user terminal and the corresponding log may be displayed.

According to an example, a network operator may conveniently view the information of each user terminal accessing the public network IP and corresponding logs, which may conveniently and quickly learn about cases about each user terminal accessing the public network IP for ease of management.

For example, it may be assumed that a public network set up by a network operator is IP15.26.33.58, the number of user terminal allowed to share accessing is two, and automatic prompting may be set up. In such a case, when it is detected that more than two user terminals share access the public network IP, prompt information may be automatically sent to each user terminal accessing the public network IP.

Supposing a user terminal A, a user terminal B and a user terminal C access an extranet by using the same public network IP "15.26.33.58" through HTTP proxy, where the user terminal A, the user terminal B and the user terminal C may all start the 360 Safeguard, and the user terminal B and the user terminal C may both start the Thunder.

When the 360 Safeguards in the user terminal A, the user terminal B and the user terminal C are in starting state and the Thunders in the user terminal B and the user terminal C are in starting state, three different mid values may be detected in application layer packets whose application type is the 360 Safeguard, and two different peerid values may be detected in application layer packets whose application type is the Thunder. It may be determined that three user terminals may share access the public network IP "15.26.33.58" according to the mid values in application layer packets. It may be determined that two user terminals may share access the public network IP "15.26.33.58" according to the peerid values in application layer packets. The maximum value 3 may be determined from two numerical values 2 and 3 to serve as the number of user terminals accessing the public network IP "15.26.33.58". In this way, finally it may be determined that three user terminals may share access the public network IP "15.26.33.58".

Since the numerical value 3 is greater than the second threshold 2 preset by the network operator, a prompting operation may be triggered, e.g., prompt information may be respectively sent to the user terminal A, the user terminal B and the user terminal C. Further, logs may be generated for application layer packets of each user terminal for display.

Figure 9:
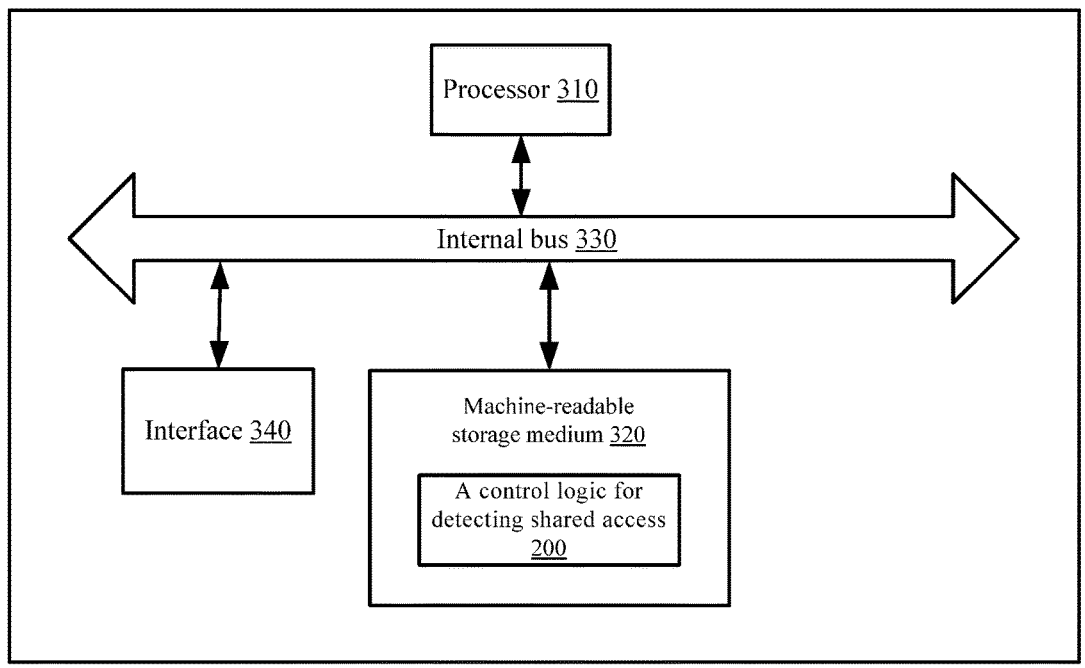
FIG. 9 is a schematic diagram of a hardware structure of a device for detecting shared access according to an example of the present disclosure.

A device for detecting shared access of the present disclosure may be applied to a network device such as an access equipment. The device for detecting shared access may be implemented by means of software, or may be implemented by means of hardware or a combination of software and hardware. As shown in FIG. 9, which is a hardware structure diagram of the device for detecting shared access according to the present disclosure, the device may include a processor 310 and a machine-readable storage medium 320, where the processor 310 and the machine-readable storage medium 320 generally may be interconnected via an internal bus 330. In other possible problems, the device may further include a network interface 340 to enable to communicate with other devices or parts. The device may further include other hardware, such as a forwarding chip for processing a packet. From a perspective of a hardware structure, the device may also be a distributed device, and may include a plurality of interface cards so as to extend processing for packet at a hardware level.

In different examples, the machine-readable storage medium 320 may be a random access memory (RAM), a volatile memory, a non-volatile memory, a flash memory, a memory drive (such as a hard disk drive), a solid state drive, any type of memory disks (such as an optical disk or a DVD and so on), or a similar storage medium or a combination thereof.

Figure 10:
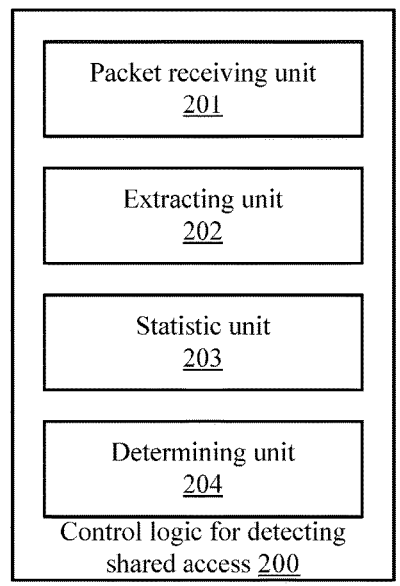
FIG. 10 is a schematic block diagram of a control logic for detecting shared access according to an example of the present disclosure.

Referring to FIG. 10, the machine-readable storage medium 320 may store machine-executable instructions corresponding to a control logic 200 for detecting shared access. Functionally divided, the control logic 200 for detecting shared access may include a packet receiving unit 201, an extracting unit 202, a statistic unit 203 and a determining unit 204.

The packet receiving unit 201 may be configured to receive an application layer packet from a user terminal.

The extracting unit 202 may be configured to extract a public network IP accessed by the user terminal and a data stream feature from the received application layer packet, where the data stream feature uniquely identifies the user terminal.

The statistic unit 203 may be configured to determine a number of user terminals which access the public network IP according to the data stream feature.

The determining unit 204 may be configured to determine that there is shared access for the public network IP if the number of user terminals accessing the public network IP is greater than a first threshold.

Figure 11:
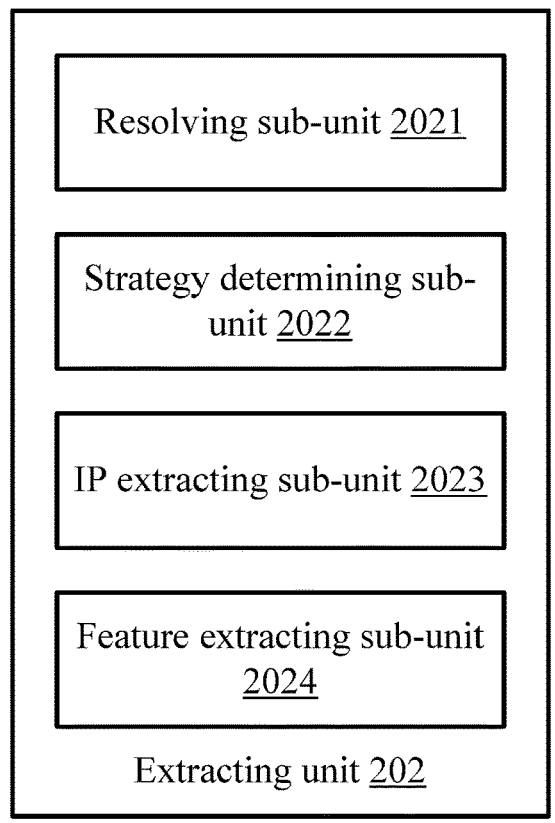
FIG. 11 is a schematic block diagram of an extracting unit according to an example of the present disclosure.

As shown in FIG. 11, according to an example, the extracting unit 202 may include a resolving sub-unit 2021, a strategy determining sub-unit 2022, an IP extracting sub-unit 2023 and a feature extracting sub-unit 2024.

The resolving sub-unit 2021 may be configured to resolve the application layer packet to determine an application type of the application layer packet.

The strategy determining sub-unit 2022 may be configured to determine an extraction strategy according to the application type of the application layer packet.

The IP extracting sub-unit 2023 may be configured to extract the public network IP accessed by the user terminal from the application layer packet.

The feature extracting sub-unit 2024 may be configured to extract a data stream feature from the application layer packet according to the determined extraction strategy.

Figure 12:
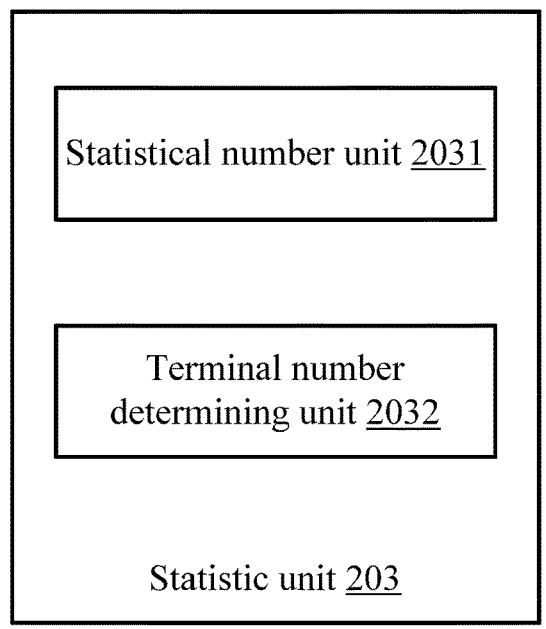
FIG. 12 is a schematic block diagram of a statistic unit according to an example of the present disclosure.

As shown in FIG. 12, according to an example, the statistic unit 203 may include a statistical number unit 2031 and a terminal number determining unit 2032.

The statistical number unit 2031 may be configured to determine a number of different data stream features for application layer packets of each application type The terminal number determining unit 2032 may be configured to determine the number of user terminals which access the public network IP according to the number of different data stream features for application layer packets of each application type.

Figure 13:
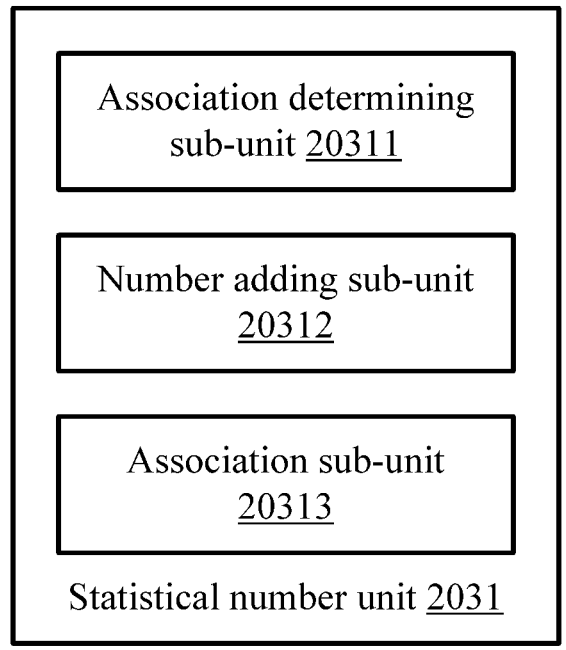
FIG. 13 is a schematic block diagram of a statistical number unit according to an example of the present disclosure.

As shown in FIG. 13, according to an example, the statistical number unit 2031 may include an association determining sub-unit 20311, a number adding sub-unit 20312 and an association sub-unit 20313.

The association determining sub-unit 20311 may be configured to determine whether the public network IP is associated with a first data stream feature of an application layer packet of a first application type or not.

The number adding sub-unit 20312 may be configured to add the number of data stream features for application layer packets of the first type by 1 if the public network IP is not associated with the first data stream feature yet.

The association sub-unit 20313 may be configured to associate the public network IP with the first data stream feature for application layer packets of the first application type if the public network IP is not associated with the first data stream feature yet.

Figure 14:
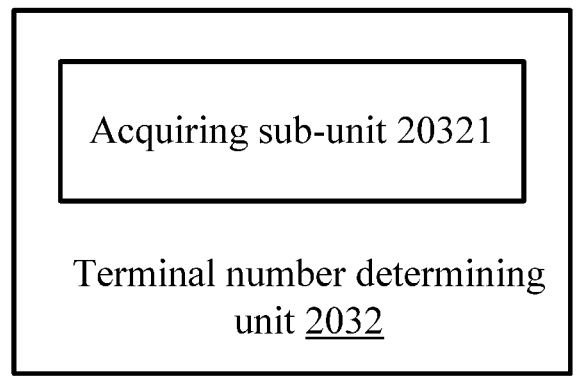
FIG. 14 is a schematic block diagram of a terminal number determining unit according to an example of the present disclosure.

As shown in FIG. 14, according to an example, on the basis of the device as shown in FIG. 10, the terminal number determining unit 2032 may include an acquiring sub-unit 20321.

The acquiring sub-unit 20321 may be configured to determine a maximum value of the number of different data stream features for application layer packets of each application type, and take the maximum value as the number of user terminals which access the public network IP.

Figure 15:
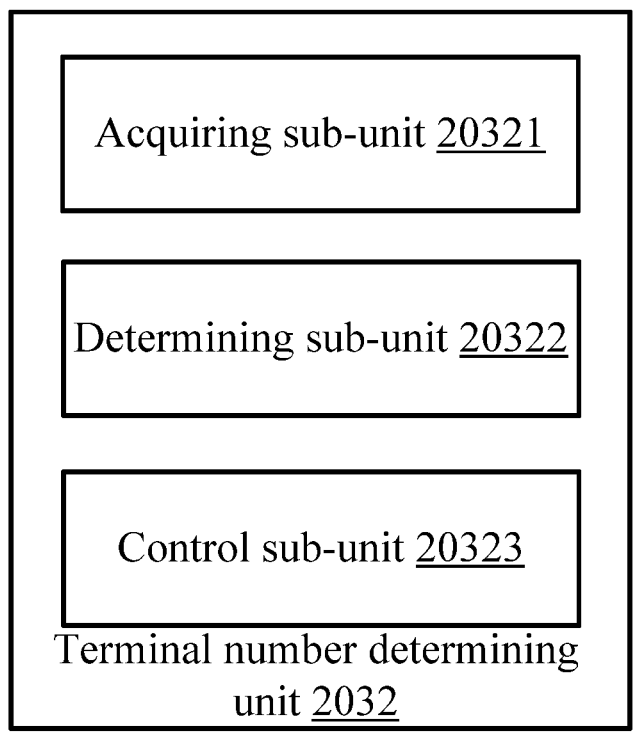
FIG. 15 is a schematic block diagram of a terminal number determining unit according to another example of the present disclosure.

As shown in FIG. 15, according to an example, the terminal number determining unit 2032 may include the acquiring sub-unit 20321, a determining sub-unit 20322 and a control sub-unit 20323.

The determining sub-unit 20322 may be configured to determine whether the maximum value is greater than a second threshold.

The control sub-unit 20323 may be configured to execute an access control on application layer packets of the public network IP if the maximum value is greater than the second threshold.

The access control may include at least one of followings:
sending prompt information to a user terminal accessing the public network IP,
controlling a network resource acquiring speed of the public network IP, and
blocking an application layer packet of the public network IP.

Figure 16:
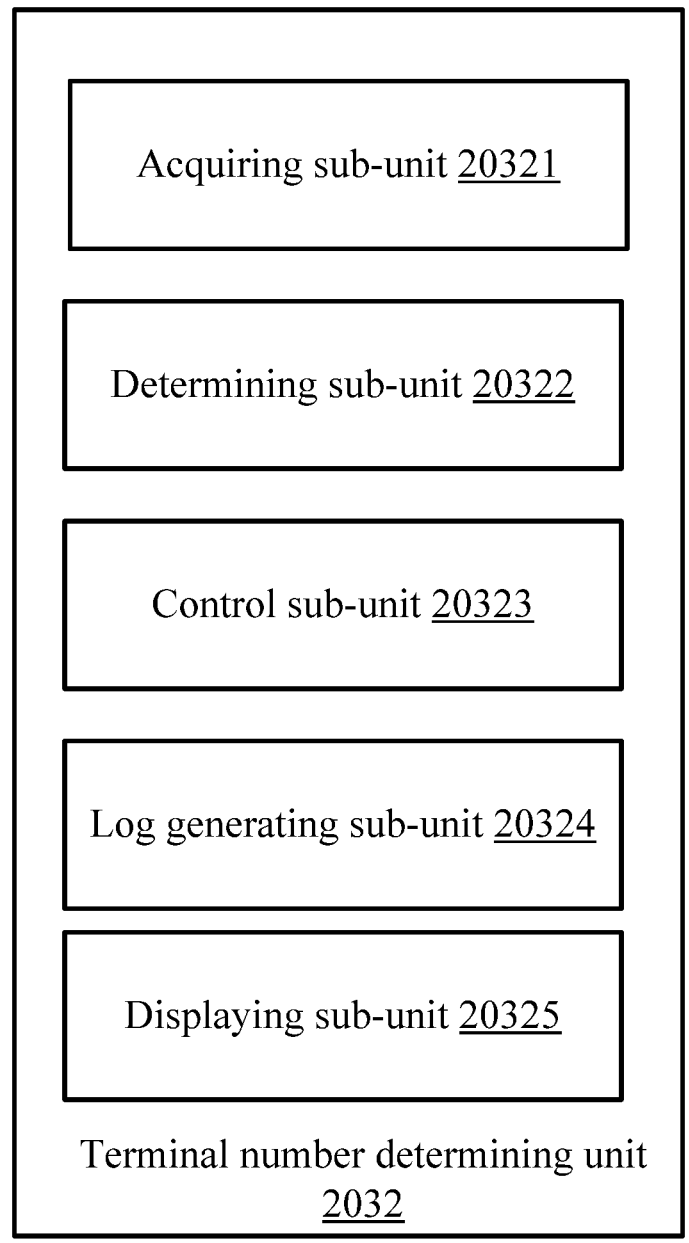
FIG. 16 is a schematic block diagram of a terminal number determining unit according to still another example of the present disclosure.

As shown in FIG. 16, optionally, the terminal number determining unit 2032 may further include a log generating sub-unit 20324 and an exhibiting sub-unit 20325.

The log generating sub-unit 20324 may be configured to generate a log for application layer packets from a user terminal accessing the public network IP.

The exhibiting sub-unit 20325 may be configured to display information of the user terminal and a corresponding log.

By taking software implementation as an example, the following may further describe how to execute the control logic 200 for detecting shared access by the device for detecting shared access. In an example, the control logic 200 for detecting shared access in the present disclosure may be interpreted as machine-executable instructions stored in the machine-readable storage medium 320. When the processor 310 on the device for detecting shared access of the present disclosure executes the control logic 200 for detecting shared access, by invoking the machine-executable instructions corresponding to the control logic 200 for detecting shared access stored in the machine-readable storage medium 320, the processor 310 may be caused to:

receive an application layer packet from a user terminal;

extract a public network IP accessed by the user terminal and a data stream feature from the received application layer packet, where the data stream feature uniquely identifies the user terminal;

determine a number of user terminals which access the public network IP according to the data stream feature; and determine that there is shared access for the public network IP if the number of user terminals accessing the public network IP is greater than a first threshold.

According to an example, when extracting the public network IP accessed by the user terminal and the data stream feature from the received application layer packet, the machine-executable instructions may cause the processor to:

resolve the application layer packet to determine an application type of the application layer packet;

determine an extraction strategy according to the application type of the application layer packet;

extract a public network IP accessed by the user terminal from the application layer packet; and extract a data stream feature from the application layer packet according to the determined extraction strategy.

According to an example, when determining the number of user terminals which access the public network IP according to the data stream feature, the machine-executable instructions may cause the processor to:

determine a number of different data stream features for application layer packets of each application type; and determine the number of user terminals which access the public network IP according to the number of different data stream features for application layer packets of each application type.

According to an example, when determining the number of different data stream features for application layer packets of each application type, the machine-executable instructions may cause the processor to:

determine whether the public network IP is associated with a first data stream feature of an application layer packet of a first application type or not;

if the public network IP is not associated with the first data stream feature yet, add the number of data stream features for application layer packets of the first application type by 1; and associate the public network IP with the first data stream feature for application layer packets of the first application type.

According to an example, when determining the number of user terminals which access the public network IP according to the number of different data stream features for application layer packets of each application type, the machine-executable instructions may cause the processor to determine a maximum value of the number of different data stream features for application layer packets of each application type and take the maximum value as the number of user terminals which access the public network IP.

According to an example, when determining the number of user terminals which access the public network IP according to the number of different data stream features for application layer packets of each application type, the machine-executable instructions may further cause the processor to determine whether the maximum value is greater than a second threshold and execute an access control on application layer packets of the public network IP if the maximum value is greater than the second threshold.

The access control may include at least one of followings:

sending prompt information to a user terminal accessing the public network IP;

controlling a network resource acquiring speed of the public network IP; and blocking an application layer packet of the public network IP.

According to an example, when determining the number of user terminals which access the public network IP according to the number of different data stream features for application layer packets of each application type, the machine-executable instructions may further cause the processor to:

generate a log for application layer packets form a user terminal accessing the public network IP; and display information of the user terminal and a corresponding log.

With regard to the devices in the foregoing examples, concrete manners for executing operations by units thereof have been described in detail in the examples related to the method, and thus are not elaborated herein.

Device examples are basically corresponding to method examples, and thus method examples may serve as reference. Device examples set forth above are merely exemplary, where units described as detached parts may be or not be detachable physically; parts displayed as units may be or not be physical units, i.e., either located at the same place, or distributed on a plurality of network units. Units may be selected in part or in whole according to the actual needs for realization of solutions of the present disclosure. It is conceivable and executable for those of ordinary skill in the art without creative work.

Other examples of the present disclosure will be apparent to those skilled in the art from consideration of the specification and practice of the discloser disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

The invention claimed is:

1. A method of detecting shared access, comprising:

receiving, by an access equipment, an application layer packet from a user terminal;

extracting, by the access equipment, a public network Internet Protocol (IP) address accessed by the user terminal and a data stream feature from the received application layer packet, wherein the data stream feature uniquely identifies the user terminal, wherein an application type of the application layer packet comprises 360 Safeguard, SogouInput, or Thunder, wherein the data stream feature is represented by a value of a mid field carried in the application layer when the application type of the application layer packet is 360 Safeguard, the data stream feature is represented by a value of an h field carried in the application layer when the application type of the application layer packet is SogouInput, the data stream feature is represented by a value of a perrid field carried in the application layer when the application type of the application layer packet is Thunder;

determining, by the access equipment, a number of user terminals which access the public network IP address according to the data stream feature; and determining, by the access equipment, that there is shared access for the public network IP if the number of user terminals accessing the public network IP address is greater than a first threshold.

2. The method according to claim 1, wherein extracting the public network IP address accessed by the user terminal and the data stream feature from the received application layer packet comprises:

resolving, by the access equipment, the application layer packet to determine the application type of the application layer packet;

determining, by the access equipment, an extraction strategy according to the application type of the application layer packet;

extracting, by the access equipment, the public network IP address accessed by the user terminal from the application layer packet; and extracting, by the access equipment, the data stream feature from the application layer packet according to the determined extraction strategy.

3. The method according to claim 1, wherein determining the number of user terminals which access the public network IP address according to the data stream feature comprises:

determining, by the access equipment, a number of different data stream features for application layer packets of each application type; and determining, by the access equipment, the number of user terminals which access the public network IP address according to the number of different data stream features for application layer packets of each application type.

4. The method according to claim 3, wherein determining the number of different data stream features for application layer packets of the application type comprises:

determining, by the access equipment, whether the public network IP address is associated with a data stream feature from the application layer packet of the application type or not;

if the public network IP address is not associated with the data stream feature from the application layer packet of the application type yet, adding, by the access equipment, the number of different data stream features for the application layer packets of the application type by 1, and associating, by the access equipment, the public network IP address with the data stream feature for application layer packets of the application type.

5. The method according to claim 3, wherein determining the number of user terminals which access the public network IP address according to the number of different data stream features for application layer packets of each application type comprises:

determining, by the access equipment, a maximum value of the number of different data stream features for application layer packets of each application type; and taking, by the access equipment, the maximum value as the number of user terminals which access the public network IP address.

6. The method according to claim 5, further comprising:

determining, by the access equipment, whether the maximum value is greater than a second threshold or not; and executing, by the access equipment, an access control on application layer packets of the public network IP address if the maximum value is greater than the second threshold.

7. The method according to claim 6, wherein the access control comprises at least one of followings:

sending, by the access equipment, prompt information to the user terminal accessing the public network IP address;

controlling, by the access equipment, a network resource acquiring speed of the public network IP address; and blocking, by the access equipment, an application layer packet of the public network IP address.

8. The method according to claim 1, further comprises:

generating, by the access equipment, a log for application layer packets from the user terminal accessing the public network IP address; and displaying, by the access equipment, information of the user terminal and a corresponding log.

9. The method according to claim 1, further comprising:

storing, by an access equipment, application layer packets of a same application type in a same storage space.

10. A device for detecting shared access, comprising a processor, which invokes machine readable instructions corresponding to a control logic for detecting shared access stored on a storage medium and executes the machine readable instructions to:

receive an application layer packet from a user terminal;

extract a public network Internet Protocol (IP) address accessed by the user terminal and a data stream feature from the received application layer packet, wherein the data stream feature uniquely identifies the user terminal, wherein an application type of the application layer packet comprises 360 Safeguard, SogouInput, or Thunder, wherein when the application type of the application layer packet is 360 Safeguard, the data stream feature is represented by a value of a mid field carried in the application layer packet, when the application type of the application layer packet is SogouInput, the data stream feature is represented by a value of an h field carried in the application layer packet; and when the application type of the application layer packet is Thunder, the data stream feature is represented by a value of a peerid field carried in the application layer packet;

determining a number of user terminals which access the public network IP address according to the data stream feature; and determine that there is shared access for the public network IP address if the number of user terminals accessing the public network IP address is greater than a first threshold.

11. The device according to claim 10, wherein when extracting the public network IP address accessed by the user terminal and the data stream feature from the received application layer packet, the machine-executable instructions cause the processor to:

resolve the application layer packet to determine the application type of the application layer packet;

determine an extraction strategy according to the application type of the application layer packet;
extract the public network IP address accessed by the user terminal from the application layer packet; and
extract the data stream feature from the application layer packet according to the determined extraction strategy.

12. The device according to claim 10, wherein when determining the number of user terminals which access the public network IP address according to the data stream feature, the machine-executable instructions cause the processor to:
   determine a number of different data stream features for application layer packets of each application type; and
   determine the number of user terminals which access the public network IP address according to the number of different data stream features for application layer packets of each application type.

13. The device according to claim 12, wherein determining the number of different data stream features for application layer packets of the application type, the machine-executable instructions cause the processor to:
   determine whether the public network IP address is associated with a data stream feature from the application layer packet of the application type or not;
   if the public network IP address is not associated with the data stream feature from the application layer packet of the application type yet,
   add the number of different data stream features for the application layer packets of the application type by 1; and
   associate the public network IP address and the data stream feature for the application layer packets of the application type.

14. The device according to claim 12, wherein when determining the number of user terminals which access the public network IP address according to the number of different data stream features for application layer packets of each application type, the machine-executable instructions cause the processor to:
   determine a maximum value of the number of different data stream features for application layer packets of each application type; and
   take the maximum value as the number of user terminals which access the public network IP address.

15. The device according to claim 14, wherein the machine-executable instructions further cause the processor to:
   determine whether the maximum value is greater than a second threshold; and
   execute an access control on application layer packets of the public network IP address if the maximum value is greater than the second threshold.

16. The device according to claim 15, wherein the access control comprises at least one of followings:
   sending prompt information to the user terminal accessing the public network IP address;
   controlling a network resource acquiring speed of the public network IP address; and
   blocking an application layer packet of the public network IP address.

17. The device according to claim 10, wherein the machine-executable instructions further cause the processor to:
   generate a log for application layer packets from the user terminal accessing the public network IP address; and
   display information of the user terminal and a corresponding log.

18. The device according to claim 10, the machine-executable instructions further cause the processor to:
   store application layer packets of a same application type in a same storage space.

\* \* \* \* \*